Aug. 25, 1925.
A. C. WILCOX
1,550,995
GLASS WORKING APPARATUS
Filed July 26, 1923    2 Sheets-Sheet 2
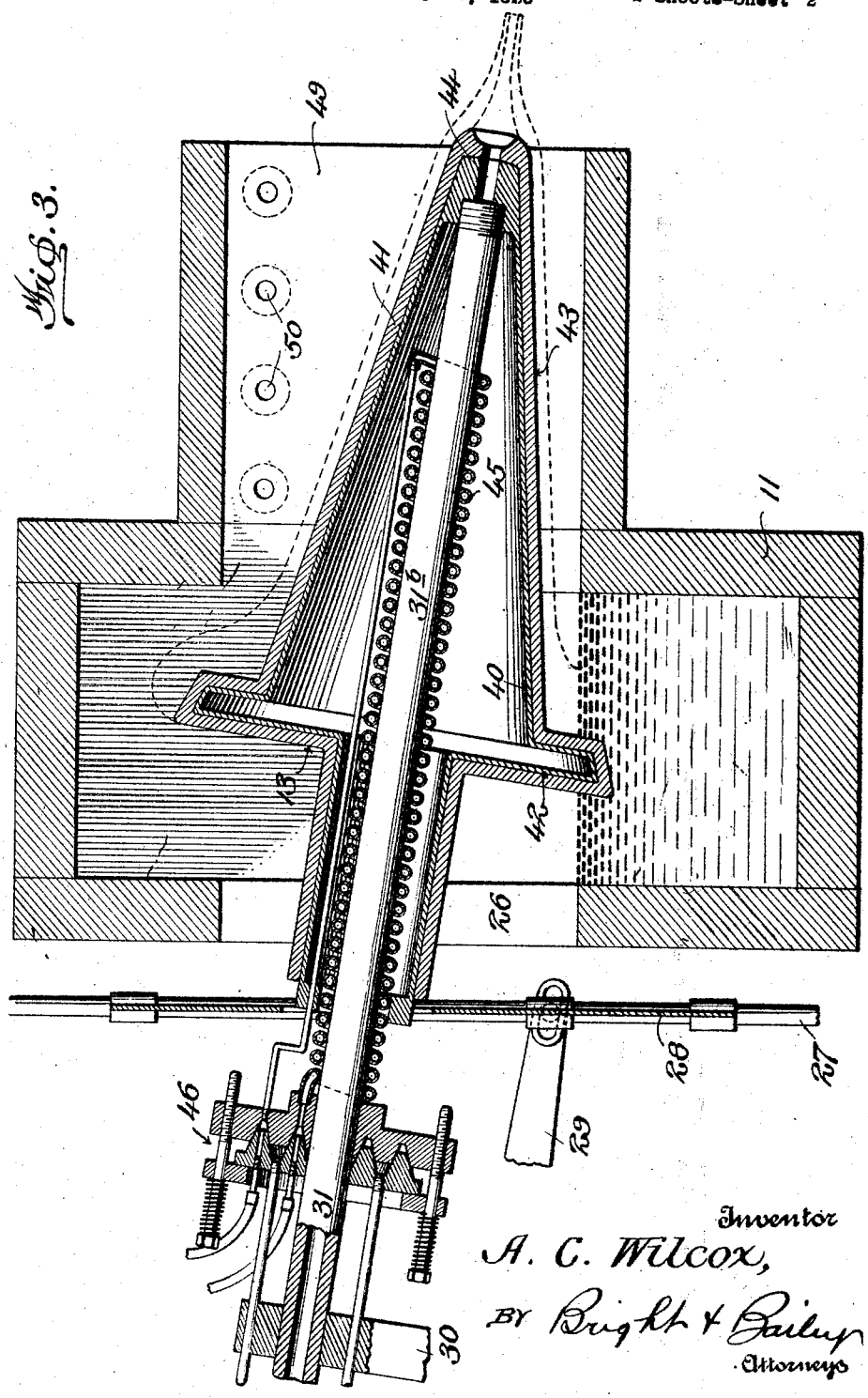

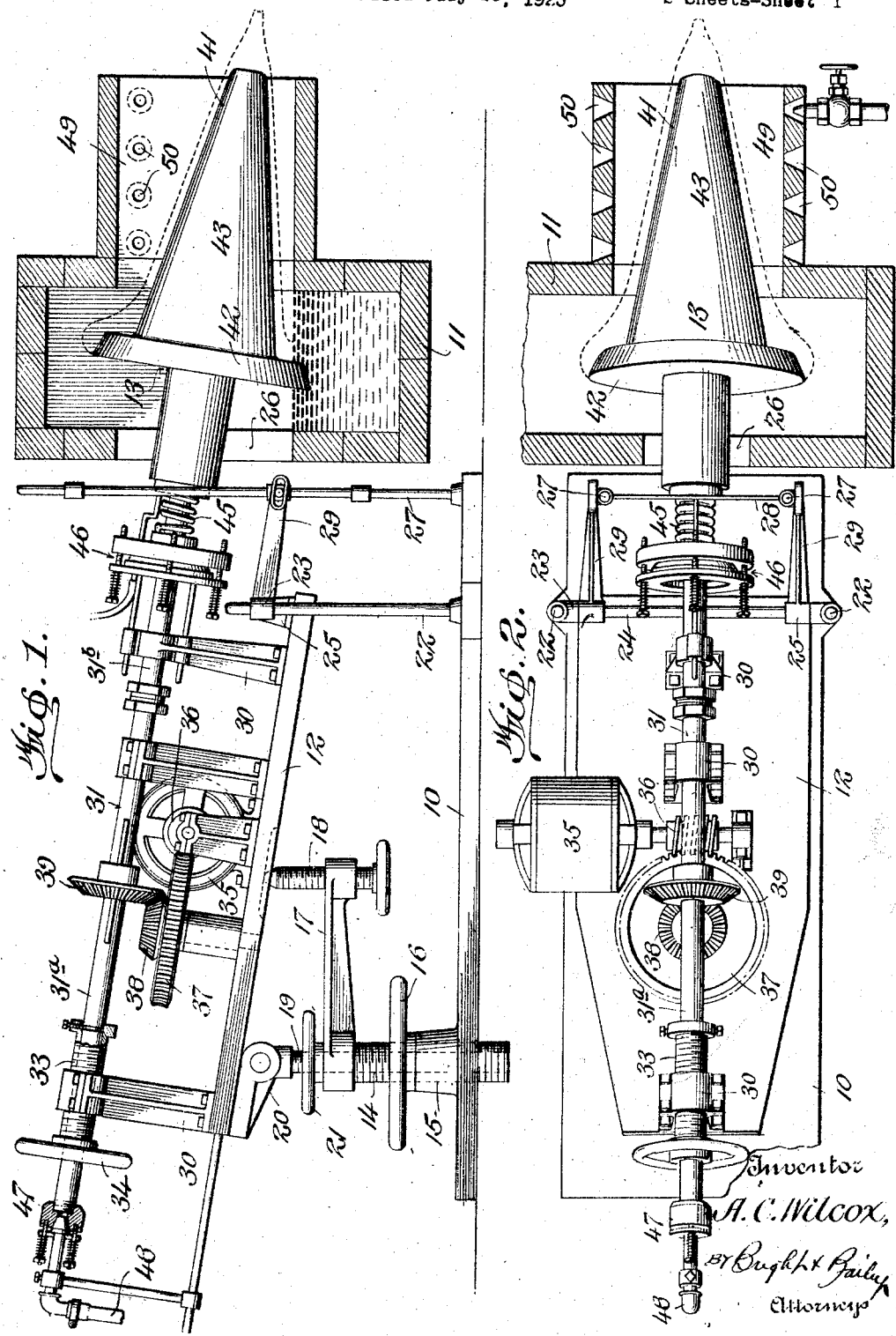

Patented Aug. 25, 1925.

1,550,995

UNITED STATES PATENT OFFICE.

ALBERT C. WILCOX, OF BRIDGEPORT, OHIO.

GLASS-WORKING APPARATUS.

Application filed July 26, 1923. Serial No. 653,980.

*To all whom it may concern:*

Be it known that I, ALBERT C. WILCOX, a citizen of the United States, and resident of Bridgeport, in the county of Belmont and State of Ohio, have invented certain new and useful Improvements in Glass-Working Apparatus, of which the following is a specification.

My invention relates to glass working, and has particular reference to improvements in apparatus designed either to gather and deliver molten glass to other apparatus by means of which it is to be finally shaped or drawn, or to gather and then shape molten glass preliminary to drawing the same directly from the apparatus to form a rod or tube.

In producing my improved apparatus, it has been my object to provide a combined gathering and delivering or forming device by means of which molten glass may be gathered for delivery to other apparatus or shaped for drawing directly from the apparatus in a single, continuous operation, to the end of materially increasing production and effecting a saving in labor and expense over methods and apparatus heretofore employed for the same general purpose.

It has also been my object to provide apparatus of the character mentioned that is of comparatively simple, inexpensive and compact construction; that is capable of different adjustments to vary the amount of glass gathered and delivered by the apparatus, and that is capable of producing tubing having exceedingly thin walls and small diameter.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views Figure 1 is a side elevation of an apparatus embodying the novel and essential features of my invention;

Figure 2, a top plan view of the apparatus shown in Figure 1; and

Figure 3, an enlarged longitudinal section through the combined gathering and forming or delivering device and its associated mechanism.

Referring now to the drawings in detail, 10 designates a suitable base or support, located in fixed relation to a tank 11 containing a supply of molten glass to be gathered and drawn. Base 10 adjustably supports a normally inclined plate 12 upon which is adjustably mounted mechanism for rotating a combined gathering and forming device 13, which latter is downwardly inclined and positioned over the molten glass supply, so as to gather and form the molten glass for continuous drawing.

In the particular embodiment of my invention herein illustrated, the adjustable connection between base 10 and plate 12 consists of a hollow, externally threaded shaft 14 that extends freely through a boss 15 on the base and has threaded thereon a hand wheel 16 that engages said boss and through manipulation of which said shaft 14 may be raised and lowered. At its upper end shaft 14 carries a lateral arm 17 that extends under plate 12 and at its outer end has threaded therein a screw 18, the upper end of which contacts with the under side of plate 12 and provides one point of support for the latter. Extending through shaft 14 is a rod 19 that is pivotally connected at its upper end, as at 20, to plate 12 to provide a second point of support for the latter adjacent to its end remote from tank 11, and on said rod is threaded a hand wheel 21 that abuts the upper end of shaft 14 and through manipulation of which the outer end of plate 12 may be raised and lowered independently of the adjustment provided by hand wheel 16 and screw 14.

As is obvious from the foregoing, by manipulating hand wheel 16 plate 12 may be raised and lowered bodily to increase or decrease the distance between base 10 and plate 12 thereby to cause a greater or less amount of "dip" of the device 13 in the molten glass contained in tank 11 without varying the angle of inclination of plate 12, while by manipulation of hand wheel 21 and screw 18, the angle of inclination of plate 12 may be varied regardless of any adjustment that is effected by means of hand wheel 16. Device 13, being carried by plate 12, consequently partakes of any adjustments that are imparted to said plate.

Rising from base 10 adjacent to tank 11 is a pair of rods 22, 22 that are disposed, respectively, on opposite sides of plate 12 and that have slidably mounted thereon blocks 23, 23 relatively connected by a horizontal rod 24 on which is mounted two or more brackets 25 that are secured to plate 12 whereby the latter is held against pivotal movement about the axes of parts 15, 19 during adjustments and use of the apparatus.

An opening 26 is provided in the rear wall of tank 11 for the accommodation of that part of the apparatus between device 13 and plate 12, said opening, as is manifest, being relatively large in order to permit adjustments of plate 12 and the mechanism carried thereby as aforementioned. The heat in tank 11 is intense, and in order to shield the apparatus on plate 12 from such furnace heat, base 10 has secured thereto a pair of rods 27, 27 that rise vertically adjacent to the tank, one to either side of opening 26, and that have mounted therebetween for vertical movement a shield in the form of a plate 28. Arms 29 connect this plate with rod 24, so that any vertical movement of plate 12 resulting from the adjustments aforementioned, is imparted to shield 28 with the result that opening 26 is at all times maintained covered and the intense heat from the furnace deflected with respect to the apparatus.

Rising from plate 12 is a plurality of brackets 30 which rotatably support a hollow shaft 31 formed preferably in two sections 31a, 31b connected in any suitable manner as indicated at 32, whereby that section which carries the device 13 may be separated from the other section to permit replacement or repair of device 13 without disturbing the entire mechanism.

In the present embodiment of my invention, section 31b is the removable section and section 31a the permanent section of shaft 31 and, as shown, section 31a is provided with means whereby it and consequently any section 31b that may be connected therewith may be longitudinally adjusted to secure minute adjustments of device 13 with respect to the molten glass supply. This means consists of a sleeve 33 threaded with respect to one of the brackets 30 and embracing section 31a and having rotatable, but non-sliding connection with the latter through the instrumentality of a pin in the sleeve engaging an annular groove in said shaft section 31a, or in any other preferred manner, so that when sleeve 33 is rotated, shaft 31 is moved longitudinally as is obvious. A hand wheel 34 is provided on sleeve 33 to facilitate its manipulation.

The means for rotating shaft 31 consists of an electric motor 35 mounted on plate 12 and carrying on its drive shaft a worm 36 that meshes with a worm wheel 37 rotatably mounted on a suitable stub shaft rising from plate 12, said worm wheel having fixed with respect thereto a bevel gear 38 that meshes with a similar gear 39 on shaft 31. Gear 39 is slidably but non-rotatably mounted on shaft 31 whereby said shaft may be longitudinally adjusted without disturbing its driving connection with the motor.

Device 13 preferably is substantially of the form shown in the drawings, that is, it comprises a hollow shell 40 provided with a covering of fire clay or other suitable heat resisting material 41, and in general outline it partakes of the shape of a cone, the base portion of which is enlarged to provide a gathering disk 42 and its remaining, gradually tapered portion 43 constituting what I term a former or shaping surface, the device as an entirety being downwardly inclined as shown.

Section 31b of shaft 31 extends through device 13 and has said device fixed thereto, whereby the latter is rotatable therewith, the smaller end of device 13 being provided with an opening 44 in communication with the passage that extends through said shaft, as shown in Figure 3 of the drawings.

A coil 45 surrounds shaft 31 within the shell 40 and this coil is adapted to be supplied with a cooling fluid thereby to keep down not only the temperature of the air that is adapted to pass through shaft 31, but also the temperature of device 13. Any suitable connection may be provided such as is generally indicated at 46, for supplying coil 45 with a cooling fluid such as water and for conveying such cooling fluid from the coil after it has passed therethrough.

As intimated in the foregoing, disk 42 of device 13 is adapted to gather molten glass from the tank 11 and elevate it to the forming portion 43 over the surface of which latter it is adapted to flow under the influence of gravity and thereby be initially shaped prior to being drawn off from the smaller end of said forming portion by mechanism (not shown) of any preferred type. Now in order that the "draw" shall assume a tubular form, it is necessary that air or other fluid be introduced through the nose or smaller end of the device as the drawing takes place, and to this end I provide a swivel connection indicated generally at 47 between the end of section 31a of shaft 31 remote from tank 11 and a hose or pipe 48 leading from a source of fluid supply, whereby said fluid supply may be maintained as shaft 31 and device 13 rotate.

The forming or shaping portion 43 of device 13 extends from the tank 11 through a reheating chamber 49 which latter is provided with a plurality of openings 50 for directing flame from a plurality of burners, so spaced that by utilization of certain or all of them, the consistency of the molten glass as it flows over the forming portion of device 13, may be maintained at any desired state for most efficient drawing.

The operation of my improved apparatus is apparent and as follows:—Motor 35 is set in operation to slowly rotate device 13 and the various adjustments aforementioned are utilized to secure a proper "dip" of the gathering disk 42 in the molten glass. When the molten glass begins to flow properly over the forming portion 43 and off the nose of the latter as a result of rotation of device 13, the adjustment of the depth of the "dip" and regulation of the heat in the reheating chamber, air is introduced through the shaft 31 and opening 44 to cause the "draw" to assume a hollow or tubular form. On the other hand, if it is desired that the "draw" shall be solid instead of tubular, the air supply through shaft 31 and opening 44 is cut off.

In the embodiment of my invention herein illustrated, it will be observed that gathering disk 42 and forming element 43 are formed as a single unit and have coincident axes, so that in effect one end of forming element 43 constitutes a means for gathering molten glass and delivering it to the shaping surface of said forming element. I deem it within the realm of my invention, however, to produce portions 42, 43 as separate elements, the latter of which I may or may not rotate, the important essential of my arrangement residing particularly in the provision whereby disk 42 delivers its gathered glass in the direction of its axis of rotation rather than to one side thereof or in some other manner. Preferably, however, I rotate forming portion or element 43 as I have found that by so doing I am enabled to produce drawn glass tubing having exceedingly thin walls and small diameter.

While I have heretofore described my invention as embodied in an apparatus for drawing glass tubing, it will be apparent that instead of the molten glass being removed directly from the device 13, suitable glass working apparatus could be located at the free or delivery end of said device to receive molten glass therefrom for subsequent formation by the receiving apparatus. In such adaptation of my invention the device 13 would simply constitute a gathering and delivering apparatus, the scope of my invention being such as to include either of the foregoing adaptations.

From the foregoing description considered in connection with the accompanying drawings, it is believed that the construction, operation and advantages of my improved apparatus will be thoroughly understood. It is desired to point out, however, that various changes and desirable additions may be made in and to the arrangement shown within the spirit and scope of my invention as defined in the appended claims.

I claim:—

1. In glass working apparatus, a rotatable member having an inclined surface over which molten glass is adapted to flow continuously towards one end of the member, and means included in said member at its other end to elevate molten glass continuously from a supply and deliver it to said surface.

2. In glass working apparatus, a rotatable member having an inclined surface over which molten glass is adapted to flow continuously towards one end of the member, and means included in said member at its other end to elevate molten glass continuously from a supply and deliver it in the direction of the axis of rotation of the member to said surface.

3. In glass working apparatus, a rotatable inclined member over the surface of which molten glass is adapted to flow continuously towards one end of the member, and means on said member for elevating molten glass continuously from a supply to said surface.

4. In glass working apparatus, a rotatable inclined member over the surface of which molten glass is adapted to flow continuously towards one end of the member, and means included in said member at its other end for elevating molten glass continuously from a supply to said surface.

5. In glass working apparatus, a member having an inclined surface over which molten glass is adapted to flow continuously towards one end of the member, and a rotatable gathering device operable to elevate molten glass from a supply and to deliver it continuously to said surface.

6. In glass working apparatus, a rotatable member from one end of which molten glass is adapted to be delivered continuously, and a rotatable gathering device included in said member operable to elevate molten glass from a supply and to deliver it continuously in the direction of the axis of rotation of said device directly to said member.

7. In glass working apparatus, a member having a surface over which molten glass is adapted to flow continuously, and a rotatable gathering device operable to elevate molten glass from a supply and to deliver it continuously in the direction of the axis of rotation of said device to said surface.

8. In glass working apparatus, a rotatable member including a shaping surface over which molten glass is adapted to flow continuously, one end of said member constituting a device operable during rotation of the member to elevate and deliver glass continuously from a supply to said shaping surface.

9. In glass working apparatus, a member having a surface over which molten glass is adapted to flow continuously, and a rotatable gathering device operable to elevate molten glass from a supply and to deliver it continuously in the direction of the axis of rotation of said device to said surface, the axis of rotation of said gathering device being fixed with respect to said member.

10. In glass working apparatus, a downwardly inclined rotatable member having a surface from the lower end of which molten glass is adapted to be delivered continuously, and an enlargement at the upper end of said member operable during rotation of the latter to elevate and deliver molten glass to the upper end of said surface.

11. In glass working apparatus, a rotatable downwardly inclined member including a molten glass receiving surface from the lower end of which molten glass is adapted to be delivered, power apparatus for rotating said member, means for delivering molten glass to the upper end of said surface, and means for adjusting the inclination of said member to vary the rate of flow of the molten glass over said surface.

12. In glass working apparatus, a rotatable member one end portion of which is adapted to be partially submerged in a molten glass supply so as to elevate molten glass continuously from the supply, and the remaining portion of which is adapted to receive glass from said end portion and to shape and deliver it continuously.

13. In glass working apparatus, a plate, a shaft rotatably mounted on said plate, a member on said shaft adapted to be partially immersed in a molten glass supply so as to elevate molten glass from the supply when said shaft is rotated, a forming surface adjacent to said member to which molten glass is delivered from said member, power means for rotating said shaft, means for bodily elevating and lowering said plate to vary the depth of immersion of said member in the molten glass supply, and means for adjusting said plate to different inclinations in any elevated or lowered position thereof thereby to vary the rate of flow of molten glass from said member and said forming surface.

In testimony whereof I hereunto affix my signature.

ALBERT C. WILCOX.